United States Patent

[11] 3,614,618

[72] Inventors George F. Schrader
Lakewood;
Albinas A. Vaiciunas, Los Angeles, both of Calif.
[21] Appl. No. 35,178
[22] Filed May 6, 1970
[45] Patented Oct. 19, 1971
[73] Assignee The National Cash Register Company
Dayton, Ohio

[54] MAGNETIC SUSCEPTIBILITY TESTER
14 Claims, 11 Drawing Figs.
[52] U.S. Cl. ........................................ 324/34 S,
340/174 TF
[51] Int. Cl. ....................................... G01r 33/12
[50] Field of Search .......................... 324/34 R,
40, 34 S, 34 TA, 45; 340/174 TC, 174 TF

[56] References Cited
UNITED STATES PATENTS
2,878,444 3/1959 Feher ......................... 324/34 S
3,365,660 1/1968 Steingroever ............... 324/34 R Primary Examiner—Rudolph V. Rolinec
Assistant Examiner—R. J. Corcoran
Attorneys—Louis A. Kline and Joseph R. Dwyer ABSTRACT: A testing apparatus for nondestructive testing of the magnetic characteristics of a portion of magnetic thin-film on a magnetic recording disc is disclosed. The recording disc is inserted into a slotted area of the yoke of an electromagnet so that a DC magnetic immersion field is provided parallel to the surface of the disc. This DC field is generated in an increasing magnitude ramp at the same time that a high-frequency stimulus field is generated adjacently parallel to the magnetic thin-film. A sense winding interwoven with the stimulus field coil will pick up signals representative of how well the thin magnetic film couples the stimulus field coil and the sense coil at the various magnitudes of DC field. A plot of the rectified sense signal amplitude against the magnitude of the DC field over a short time period on a readout device indicates the differential magnetic susceptibility of the thin magnetic film by the magnitude of the ordinate of the plotted curve. A balance network is provided to cancel any coupling between the stimulus coil and sensing coil when a negative immersion field is made to saturate the thin film. The magnetic characteristics for assessing merit which may be determined are: the coercive force of the film, and the magnetic susceptibility which is a measure of the relative squareness of the hysteresis loop and therefore a measure of the maximum magnetic switching rate.

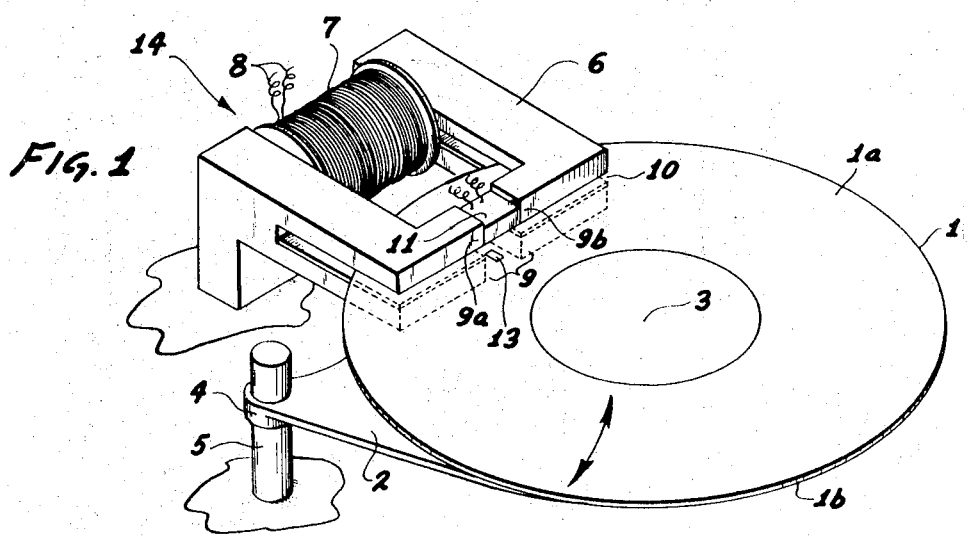
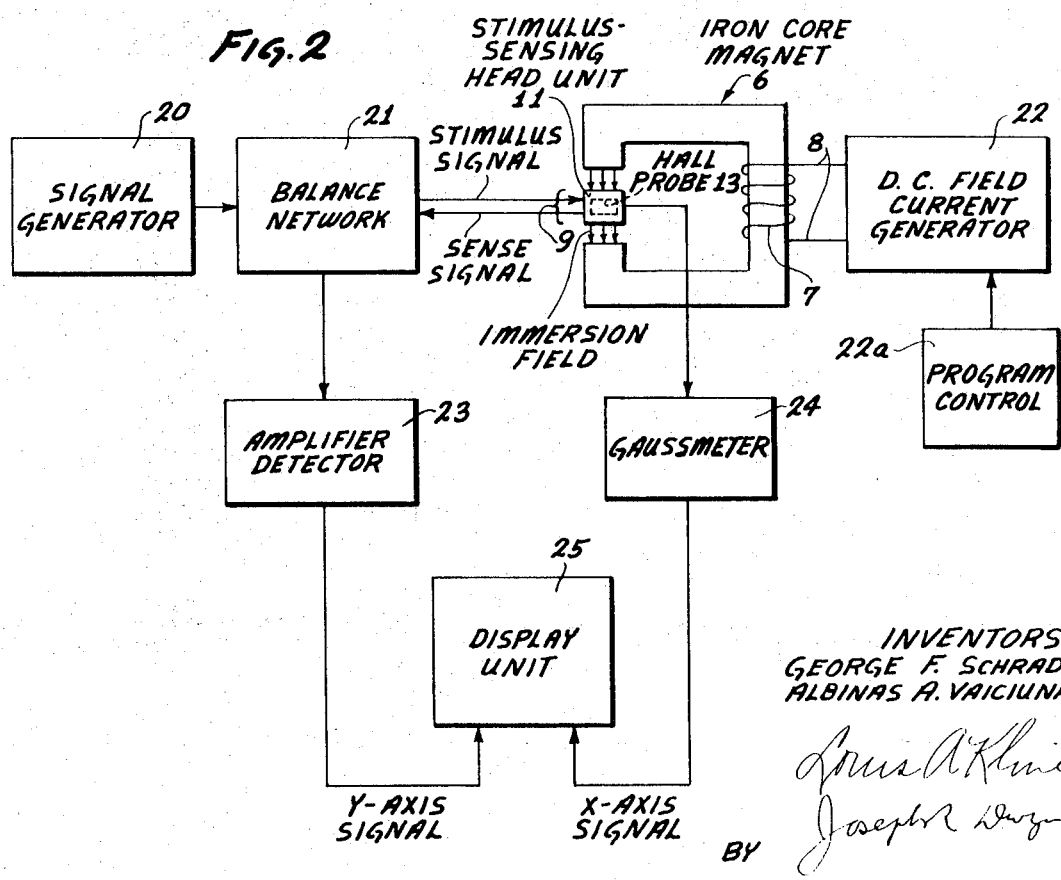

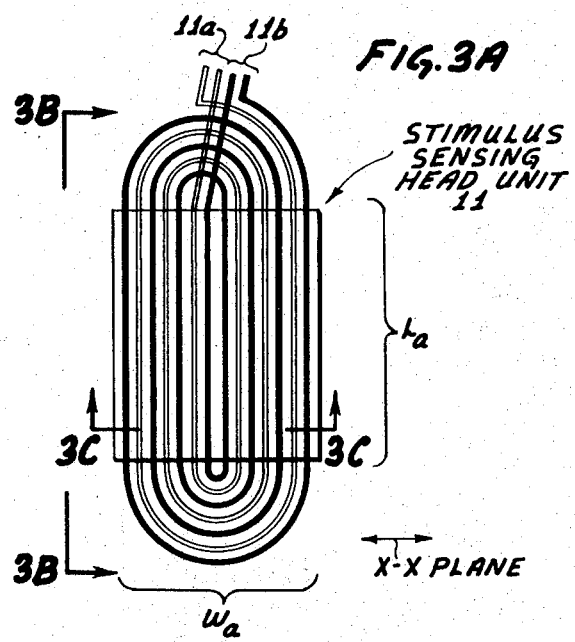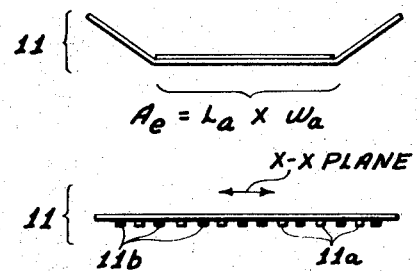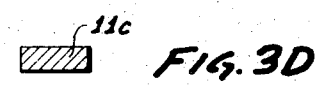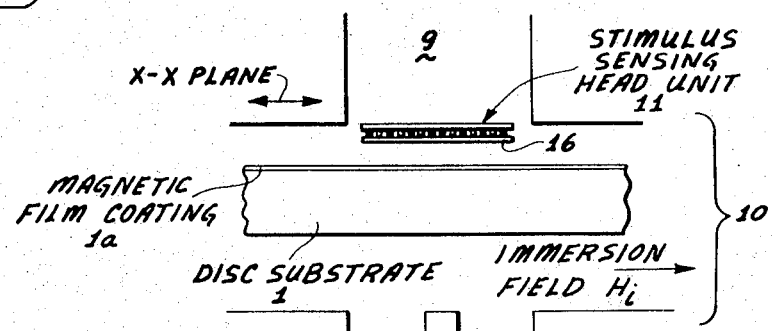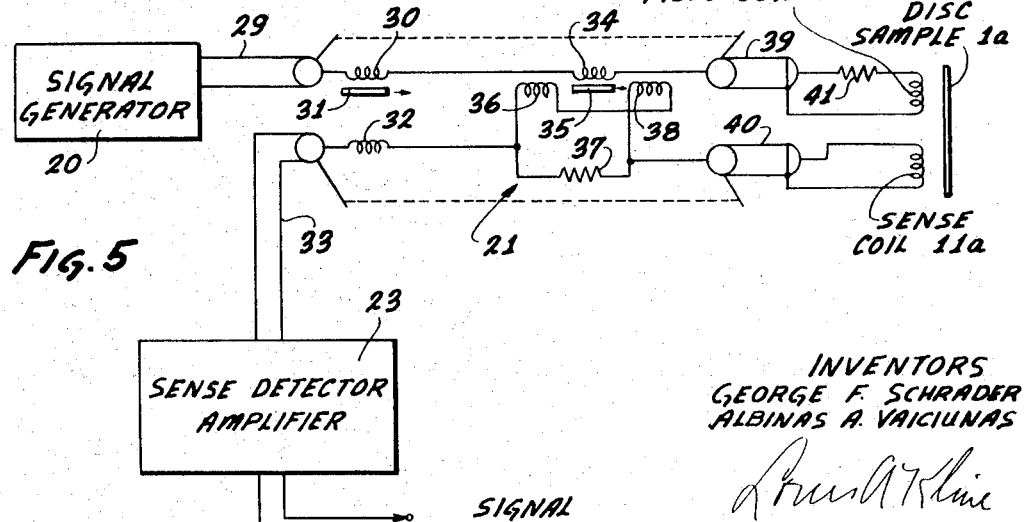

INVENTORS
GEORGE F. SCHRADER
ALBINAS A. VAICIUNAS

THEIR ATTORNEYS

MAGNETIC SUSCEPTIBILITY TESTER

BACKGROUND

One of the problems involved in the design and fabrication of magnetic thin film memories, whether they be films plated on rods or discs, is the testing of the quality of the magnetic thin film after completion of deposition of the thin film plating on the substrate.

The case to hand, we will be primarily concerned with the thin magnetic film plating on a flat disc. Prior methods of testing the quality of the magnetic thin films involved destructive methods. In such cases a portion of a magnetically plated disc was cut out of the disc and then placed in a magnetic testing device in order to determine how effective and how efficient the magnetic thin film on the surface of the disc had turned out to be. The commonly used device was a 60 cycle B-H tester which could only test cut up samples and which required large amounts of power. Further the B-H tester could only indicate the average merit of both sides of coated film on a disc and could not selectively measure just one side.

In the present testing system for magnetic thin films, the testing can be done nondestructively, and without the need for cutting samples from a disc or plate thus destroying its usefulness. Further, in the present system which allows usage of a slowly varying DC magnetic immersion field parallel to the surface of the magnetic disc, there is no need for enormous power requirements, and the main magnetic field can be varied as slowly as desired without upsetting the readout.

The tester of the present invention is the only known tester which can be arranged to measure the magnetic properties of thin film on each side of the disc separately without the need for testing the integrated combination of the top side portion and bottom side portion of the magnetic thin film on the disc surfaces.

Thus it will be seen that considerable advantages accrue in the testing of magnetic susceptibility of thin films on disc substrates which heretofore were not possible nor practical.

BRIEF SUMMARY OF INVENTION

The apparatus described herein provides simplified and extremely accurate means for testing the condition of a magnetic thin film when the thin film is immersed in a strong DC magnetic field of a varying magnitude of values. A test fixture is provided wherein a controllable electromagnet has a yoke, at one end of which are provided two sets of pole pieces having a gap therebetween. The pole pieces have a longitudinal slotted area into which may be placed a disc or other substrate having a thin magnetic film thereon.

In the area of the thin film which is situated between the poles of the yoke, an adjustable DC magnetic immersion field is provided parallel to the plane of the disc, and its thin film. This DC immersion field may be varied in a ramp function from zero to a high value and then again, in a decreasing ramp function, may be varied from the high value to a zero value again. This is done in a relatively slow fashion, for example, a 10 sec. period is used to raise the immersion field from zero to 1,500 oersteds and another 10 sec. period is used to lower the immersion field from 1,500 down to zero oersteds. The maximum immersion field needed is only that value required to saturate the magnetic thin film and may in some cases require only a maximum value of 800 oersteds.

During the time that the immersion field is going through its cycle of a linear rise and a linear fall, a 10.7 megahertz signal generator is used to drive a stimulus coil which lies parallel and adjacent to the thin film between the pole pieces of the electromagnet yoke. The stimulus coil generates a magnetic field which passes through the surface area of the thin film. Depending on the quality of the magnetic thin film, a portion of the flux generated by the stimulus coil will be intercepted and picked up by a sense coil which is interlinked closely adjacent to the stimulus coil and the surface of the thin film between the pole gaps.

The signal from the sense coil is passed through a balancing network to a 10.7 megahertz amplifier-detector which amplifies and rectifies the sense signal providing output for the Y-axis of an X-Y Plotter in order to draw a curve trace which indicates the magnetic susceptibility of the thin film area being tested as a function of the value of the immersion field during a 20 sec. testing cycle.

A DC field current generator is programmed to excite the electromagnet in such a manner as to provide an immersion field which has a linear rising ramp and a linear falling ramp. A program control unit controls the current to the electromagnet and also allows for switching the current in the opposite direction through the electromagnet to provide a reverse or negative immersion field than the normal direction for purposes of nullifying unwanted pick up signals from the sense coil.

The balance network is used for the purpose of making a "-zero level" setting of the coupling factor between the stimulus coil and sense coil when a "negative" immersion field saturates the magnetic thin film. Thus the increase in picked-up signal by the sense coil when the magnetic film is tested in the gap will indicate the influence of the magnetic film quality and immersion field magnitude on the amount of signal picked up. The balance network provides for cancellation of both in-phase and out-of-phase components of the sense signal in the sense coil in order to provide a complete zero level or starting point condition.

In order to measure the instantaneous value of the DC immersion field in the gap between the pole pieces, a Hall probe is situated between the pole pieces providing an output voltage which is coupled to a Gauss meter. The Gauss meter provides an amplified voltage output which is fed to the X-axis input of an X-Y Plotter so that the magnitude of the immersion field becomes the abscissa of the curve plotted on an X-Y Plotter, while the ordinate or Y-axis of the plotter is a function of the signal picked up by the sense coil.

DRAWINGS

FIG. 1 is a perspective view of the magnetic susceptibility testing fixture showing how a magnetic disc unit with a thin film surface may be moved into the slotted area between pole pieces of the electromagnet;

FIG. 2 is a block diagram of the overall system showing the components thereof;

Figure 6A:
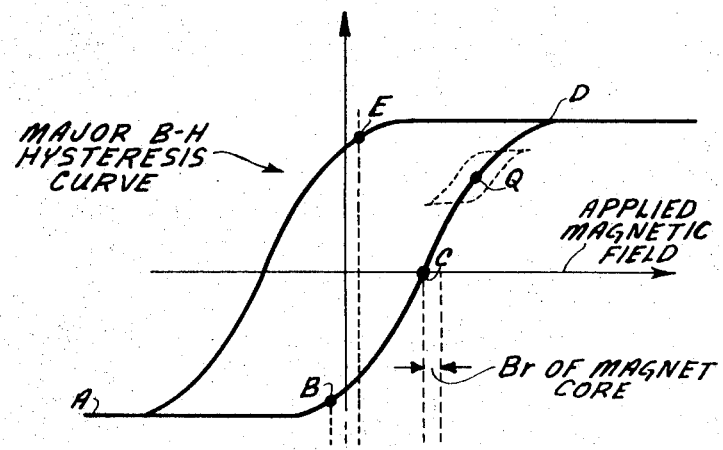
Figure 6B:
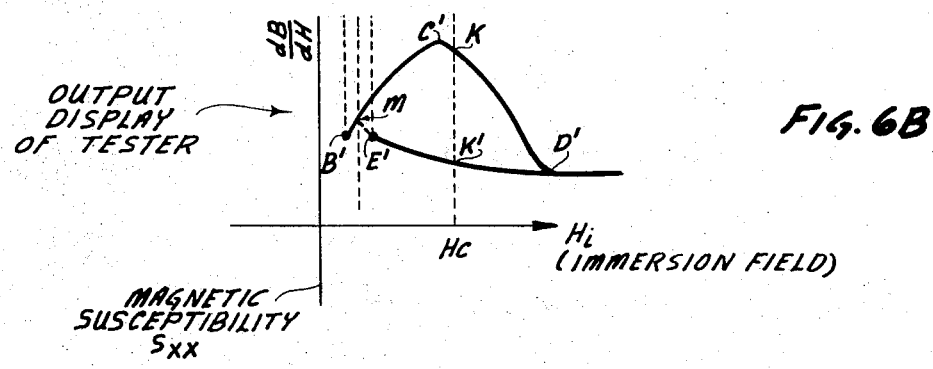
Figure 7:
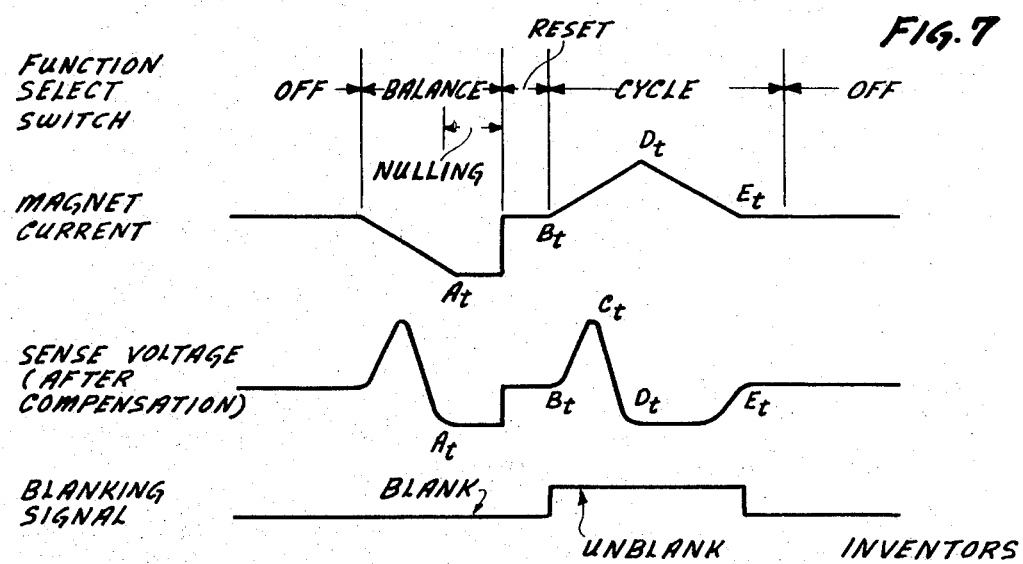

FIG. 3A shows the details of the head unit showing the interrelationship of the stimulus coil and the sense coil which cooperates with a surface area of the thin film on the magnetic disc surface, FIG. 3B shows a side view of the said head unit as viewed along line 3B of FIG. 3A, FIG. 3C shows a side view taken along line 3C of FIG. 3A, FIG. 3D shows a cross section of an individual ribbon of wire used in making the stimulus and sense coils;

FIG. 4 shows a schematic view of the magnetic disc in proximity to the stimulus sensing head unit within the slotted gap area of the pole pieces of the electromagnet;

FIG. 5 is a schematic drawing of the balance network showing its relationship to the high-frequency signal generator, the stimulus and sense coils, and the high frequency amplifier-detector;

FIG. 6A shows the major hysteresis B-H loop of the magnetic thin film as it would appear from a B-H test, FIG. 6B shows the output display trace provided by the invention and how the trace relates to the hysteresis loop, FIG. 7 is a timing sequence diagram which illustrates the relationship of electromagnetic current, sensing voltage, and other factors during the testing sequence.

DESCRIPTION OF PREFERRED EMBODIMENT

The preferred embodiment of the invention will be described in reference to nondestructive testing of the surface magnetic thin film plated on the surface of a disc. Variations of the apparatus may be constructed for testing thin films on cylindrical rods, drums, or other configurations.

With reference to FIG. 1, a controllable electromagnet is provided wherein a heavy-duty field coil 7 is wound around an iron core having an encircling yoke 6 to conduct the flux in a magnetic circuit. The yoke 6 is cut to provide an airgap 9 through the cross section thereof to form magnetic poles 9a and 9b. Further, a longitudinal slot 10 is cut into a portion of the yoke so that a disc may be moved into and out of the slotted area 10.

The disc 1 is conventionally made of a substrate 1b onto which a thin magnetic film 1a, of the order of thickness of 10,000 angstroms, is plated on the surface thereof. The disc is supported by a movable baseplate 2 mounted on a base bearing 4 such that the baseplate 2 may be moved on the pivot rod 5 into or out of the slotted area of the yoke.

Placed in the yoke pole gap 9 is a stimulus-sensing head unit 11 which sits closely above the surface of that portion of the magnetic thin film 1a residing in the pole gap of the slotted area of the yoke.

The stimulus-sensing head unit 11 is made of two closely interwoven coils which present a planar surface configuration to the surface of the thin film. Reference to FIGS. 3 and 4 will provide a detailed view of this unit, which will be discussed hereinafter.

FIG. 2 shows in schematic form the elements of the system used in the apparatus of the invention. In order to drive the stimulus coil 11b (FIG. 3A) of the stimulus-sensing head unit 11; a 10 milliamp RMS driving current is provided by a high frequency signal generator 20 generating a 10.7 megahertz signal which is fed through the balance network 21 to the stimulus coil 11b (FIGS. 3A, B, C) in the pole gap 9. It is required that the high-frequency signal generator provide a symmetrical AC output which has no DC component and no even harmonics. It may have a crystal controlled frequency generator and is of the conventional type such as used in FM radio. It has no need for generation of any frequencies other than the 10.7 megahertz, or whatever drive frequency is chosen.

The stimulus coil and sense coil are composed of flat ribbon wires which are bifilar wound in a helical pattern on a horizontal plane.

Referring to FIG. 3A, it will be seen that the stimulus-sensing head unit 11 is composed of two bifilar wound coils which in essence are interlooped. The stimulus coil winding 11b and the sense coil winding 11a are shown in greater detail in FIG. 3C along what is the horizontal or designated X—X plane. A cross-sectional view of the flat ribbon wire used is designated as 11c in FIG. 3D.

The stimulus sensing head unit 11 provides an effective area designated in FIG. 3A as having length $L_a$, and width $W_a$, which area is place in proximity to the magnetic film to be tested. FIG. 3B shows a side view of the stimulus-sensing head unit 11 wherein the end areas of the coil are turned up at an angle to remove them from the proximity of the magnetic film and so that the effective area $A_e$, will essentially be the area encompassed by $L_a$ multiplied by $W_a$.

As will be seen in FIG. 4, a spacer 16, which is a thin film of mylar, is bonded to the lower horizontal portion of the head unit 11 to present a smooth surface for juxtaposition to the magnetic film coating 1a.

The signal provided by the signal generator to the stimulus coil 11b is converted to a magnetic flux field around the stimulus-sensing head unit adjacent the surface 1a of the thin film of the disc. Thus, the magnetic thin film 1a provides coupling from the stimulus coil 11b to the sense coil 11a which results in an induced voltage within the sense coil which is fed back through the balance network 21.

As can be more specifically seen in FIG. 5 the balance network 21 has several adjustments for adjusting coupling between separate circuits provided therein. A ferrite slug 31 is provided to adjust coupling between coil 30 and coil 32; likewise, a second ferrite slug 35 is used to adjust the coupling between coil 34 and coils 36 and 38.

Thus the driving current from the 10.7 megahertz signal generator 20 is fed through a coaxial cable 29 through coil 30 to coil 34 and through a coaxial cable 39 to the stimulus coil 11b. Due to coupling between the stimulus coil 11b and the sense coil 11a through the adjacent area of magnetic film 1a, a voltage $e_s$ is developed in the sense coil 11a which is fed along coaxial line 40 to coils 36 and 38 which are parallel with resistor 37, after which the line for the sense coil output passes through coil 32, then through a coaxial cable output line 33 to the tuned sense detector-amplifier 23.

The balance network 21 provides the function of setting the "zero" level output of the sense coil signal to detector-amplifier 23. The zero setting for the tester is accomplished by moving the disc to be tested into the testing gap when a "function switch" is "off." At this time the current through the electromagnet assembly 14 is zero, and there is no immersion field, $H_i$. When the "function switch" is set to "balance" the current in the electromagnet assembly 14 increases in the "-negative" direction and generates an immersion field sufficient to saturate the disc film surface. Then, the current through the electromagnet is held constant while "nulling" is accomplished. During the nulling period, ferrite slugs 31 and 35 are adjusted to cancel out the existing components of the sense signal. The output from the sense coil 11a to the detector-amplifier 23 is thus reduced to zero, to provide a starting point or "zero" setting. Thus, signal cancellation is accomplished by feeding the sense coil output through a balance network 21 between the high-frequency signal generator 20 and the tuned detector-amplifier 23.

As seen in FIG. 5, coils 30 and 32 constitute a transformer whereby a small signal from the stimulus driving line 29 is introduced into the sense line 33, the amount of this coupling being adjustable by means of a ferrite slug 31. The transformer with coils 30 and 32 may be wound on a standard one-quarter inch diameter coil formed provided with a tuning slug as used in standard variable radio frequency inductors. This adjustment is used to cancel the primary component of the unwanted stimulus-sense head unit coupling which is 90° out-of-phase with the stimulus field current.

It is also necessary to cancel the in-phase component of unwanted coupling. Thus there is provided a circuit made of coils 36 and 38, bridged by resistor 37, with coils 36 and 38 being magnetically coupled to coil 34, by ferrite slug 35. Adjustment of the ferrite slug 35 permits a signal from the stimulus driving line 29 to be coupled to the sense pickup line 33 which is in-phase with the sense line signal but opposite in polarity in order to cancel the portion of the signal due to unwanted coupling. The L/R time constant of coils 36 and 38 with resistor 37 is much greater than the period of the stimulus field variation so that the signal induced in the balance network circuit is in-phase with the stimulating field current. Thus, coils 36 and 38 couple signals of opposite polarity into the sense lines so that each couples the same magnitude of signal from coil 34 which results in zero net signal. The ferrite slug 35 coupling coil 34 to coils 36 and 38 can be moved to favor coupling to coil 36 or to coil 38 so that a net signal results in the sense line of one polarity or the other to provide a signal which is either in-phase with the stimulus current or 90° out-of-phase, which ever is required to balance out the unwanted coupling. As further seen in FIG. 5, the stimulus signal from signal generator 20 is passed on line 39 through a resistor 41 into the stimulus field coil 11b. The resulting magnetic flux passes through the disc sample 1a and is coupled to the sense coil 11a where it is then passed through line 40 to the balance detector 21, and thence through line 33 to the sense detector amplifier 23.

The sense input signal to the balance network 21 on cable 40 is a sense signal voltage of approximately 10 millivolts which also includes noise signals. The output of the balance network at cable line 33 is in the range of one to two microvolts which is fed to the input of the detector-amplifier 23.

The detector-amplifier unit 23 as shown in FIG. 2, is a high-frequency amplifier of the type used in frequency modulation radio without the use of any limiter circuit, and which in this embodiment is operated at 10.7 megahertz. It is extremely important that the detector-amplifier have a linear response so that the output voltage is an accurate reflection of the input signal amplitude. The amplification factor is on the order of one million and has a DC output in the range of one volt.

As seen in FIG. 2 (and FIG. 4) a small Hall probe unit 13 having leads 13a is placed in the pole gap 9 between the magnetic poles of the immersion field electromagnet 14. The Hall probe 13 constitutes a transducer which senses the strength of the immersion field $H_i$ in the gap area at any given moment in time. Output voltage of the Hall probe is fed through a Gaussmeter 24 which provides an output signal, as seen in FIG. 2 to the X-axis of the Display Unit 25 which indicates the instantaneous value of the immersion field during any given moment of the plotting cycle on the display.

A typically useful Gaussmeter for this embodiment may be such as that supplied by Radio Frequency Labs Incorporated, Boonton, New Jersey and designated model 750 Gaussmeter in conjunction with Hall probe unit designated HB-15950.

With reference to FIG. 2, the excitation current to the immersion field electromagnet 14 is provided through leads 8 to coil 7 which is fed by the DC field current generator 22. The field current generator can provide currents up to one ampere to coil 7 which can generate an immersion field $H_i$ in the pole gap up to 1,500 Gauss. A program control unit 22a works in cooperation with the field current generator for purposes of controlling and switching the current generator 22 in order to (a) saturate the sample area of disc so that the "zero" level of the unit can be set by cancellation of the unwanted coupling in the head unit 11 and to (b) set the immersion field to a zero value, and to (c) increase the immersion magnetization field in a linear ramp function over a period of 10 seconds and then to reduce the immersion magnetization field in a linear ramp function back down to the zero level. The 10 second rising ramp field strength and the 10 second falling ramp field strength constitute the testing cycle for a given thin film area on the disc.

The display unit 25 is the readout device for indicating the relationship of the magnetic susceptibility of the thin film being tested as a function of strength of immersion field. The display unit may be an oscilloscope, X-Y Plotter, Memoscope or other device. In this particular embodiment, an X-Y Plotter may be used wherein the X-axis of the plotter is driven by the output from the Gaussmeter which measures the immersion field, and the Y-axis is driven by the detector-amplifier from a signal representative of the incremental magnetic susceptibility of the magnetic thin film at any given condition of immersion field.

As seen in FIGS. 3A and 3B, a chosen effective surface area $A_e$ on the magnetic film surface has a length $L_a$, and width $W_a$, which area is located adjacent stimulus coil 11b and sense coil 11a. Magnetic AC flux lines emanate from the coil 11b, pass through the thin magnetic film on the area $A_e$ and are sensed by coil 11a to induce a voltage $e_s$ therein.

a. Voltage $e_s$ varies with time, i.e., $e_s=e(t)$.

The coils 11b and 11a are so oriented (FIGS. 3C and 4) that the effective flux lines which intercept coil 11a are only those in the X-X direction shown in FIGS. 3B and 4.

The entire area $A_e$, which is equal to $L_a \times W_a$, is also continuously immersed in the applied DC magnetic immersion field $H_i$ provided by electromagnet assembly 14; and the induced sense voltage $e_s$ is also a function of the applied field $H_i$.

As can be seen in FIG. 3A and FIG. 4 the amount of voltage $e_s$ induced in coil 11a will be dependent on the relative transmittance of flux through the magnetic film on area $A_e$. The transmittance factor of the magnetic film is designated as a factor of merit called magnetic susceptibility S. Since the plane of X-X directions is of interest here, this factor will be designated $S_{xx}$. Thus $S_{xx}$ is the magnetic susceptibility in the X-X direction, under the action of an immersion field $H_i$ in the X-X direction.

It has been experimentally determined that the magnetic susceptibility has an in-phase component $S'_{xx}$ and an out-of-phase component $S''_{xx}$.

In testing the merit of magnetic film, it is the absolute value of $S_{xx}$ that is desired. This value is the square root of the sum of the squares of the in-phase and out-phase components, thus:

b. (abs.) $S_{xx} = \sqrt{(S'_{xx})^2 + (S''_{xx})^2}$

More specifically, the magnetic susceptibility of a material in a particular direction, is the change in magnetization (M) of the material with an applied magnetic field (H) at a particular area. This can be expressed as:

C. $S_{vector} = d M(\text{vector})/d H(\text{vector})$

In this case the vector of interest is the magnetic susceptibility in the plane of directions parallel to the plane of the magnetic film where $H_i$ is also parallel to the film plane, and has here been designated as the X-X direction.

Since the magnetic susceptibility, $S_{xx}$ vector, is measured at a fixed frequency of stimulus field, then in order to test the transmittance of the film in either of the two X-X directions, account must be taken of the contribution to the magnetization, $M_{xx}$, in the X-X direction of the two previously mentioned components, $S'_{xx}$ and $S''_{xx}$.

The voltage generated in sense coil 11a is:

d. $e_s = e_s(t) = d\Phi/dt$ where $\Phi$ is the instantaneous flux linked by the sense coil.

Now, e. $\Phi = kM_{xx}$ where $M_{xx}$ = the instantaneous magnetization of the film in the X-X direction.

and, $k$ = a constant involving the cross-sectional area $A_e$ under the sense coil and the geometrical factors involving the coupling of the film to the sense coil.

Now, if the stimulus field, $h$, is a sine wave function of time then:

f. $h = h(t) = h \sin w t$ for a sinusoidal excitation in stimulus coil 11b.

and if, g. $\Phi = k M_{xx}$, and since

The instantaneous magnetization vector $M_{xx}$ on area A is the sum of the applied fields of:

i. electromagnetic DC applied field, $H_i$
ii. in-phase component of $h = h \sin w t$
iii. out-phase component of $h = h \cos w t$
h. $M_{xx} = H_i + h \sin w t + h \cos w t$ To get the flux $\Phi$ linked by sense coil 11b, it is necessary to take into account the magnetic susceptibility factor for each element of $M_{xx}$, and thus (where $\Phi_o$ is the flux due to $H_i$)

j. $\Phi = \Phi_o + k h S'_{xx}\sin wt + kh S''_{xx} \cos wt$
k. $= \Phi_o + k h (S'_{xx}\sin w t + S''_{xx} \cos w t)$ Now, to derive the induced voltage $e_s$ in sense coil 11b: and since $e_s = d\Phi/dt$ then (1) $$e_s(t) = \frac{d\phi_o}{dt} + \frac{d(kM_{xx})}{dt}$$

m. $e_s(t) = kwh(S'_{xx}\cos wt - S''_{xx}\sin w t)$

Now if the RMS value of the induced voltage in the sense coil, $e_s(t)$ is designated as $E$, and the RMS value of the stimulus field $h(t)$ is $H$, then n. $E = kwh\sqrt{(S'_{xx})^2 + (S''_{xx})^2}$ From equation (b) above, the square root portion is equal to the absolute value of the magnetic susceptibility $S_{xx}$, and thus, o. $E = kwhS_{xx}$ which is to say, that the RMS voltage $E$ in the sense coil is directly proportioned measure of the magnetic susceptibility $S_{xx}$.

OPERATION

In order to obtain a graphical display of the magnetic susceptibility of the deposited film surface 1a as a function of immersion field $H_i$, a programmed cycle of action is followed after establishment of the "zero" level setting with the balance network 21. FIG. 6B shows a representation of the display trace in B'C'D'E' obtained from the susceptibility tester apparatus as it relates to the major hysteresis loop ABCDE of FIG. 6A. The X-axis (abscissa) of the display trace is the value of the immersion magnetic field $H_i$ across the gap 9, and is generally designated in Oersteds. The Y-axis (magnetic susceptibility) is the rate of change of magnetic induction in the disc film surface 1a with respect to the immersion field intensity $H_i$ and can be expressed as $dB$ divided by $dH$.

As can be seen in FIG. 6B, there is a forward trace B', C', D', and a reverse trace D', E'. These traces represent the change in magnetic susceptibility of the disc thin film as the DC immersion field $H_i$ is raised to a peak level and then returned back to its original level.

Since coercive force is the value of the field H for which the induction magnetization B =O, then the coercive force, Hc, (at point C of FIG. 6A) will be seen on FIG. 6B as the extension to point Hc of the line of maximum vertical distance between the forward trace and reverse trace, as K to K', which is slightly offset from point C due to residual induction, Br, of the electromagnet core.

The residual induction of the electromagnet core, Br, is the value of magnetic induction B for which the immersion field $H_i$ is equal to O, and is represented by the area enclosed by the curve B', C', D', E', M. This area is proportional to Br.

Referring to FIG. 1, the disc to be tested such as disc 1 with magnetic surface 1a, is placed on a movable baseplate 2, having a raised center portion 3, which is then rotated on pivot rod 5 into the gap space of slot 10 of the yoke 6 of the electromagnet assembly 14. The immersion field $H_i$ provided by the electromagnet 14 is parallel to the disc surface. The electromagnet 14, is controlled by Program Control 22a and is energized to provide a peak field, which may be established at 800 Oersteds, and which is sufficient to cause saturation of the magnetic film material on the disc. The horizontal field, which is called the immersion field $H_i$, is measured at the center of a three-quarter inch pole gap 9 in the core of the electromagnet by a Hall probe 13 lodged therebetween. The program control unit 22a provides for a slowly increasing and then decreasing linear current to be passed through the electromagnet 14 which cycles the magnetic surface of the disc through the point of the hysteresis curve A, B, C, D, E, A as shown in FIG. 6A.

As seen in FIGS. 1 and 4, a stimulus-sensing head unit 11 is moved into proximity with the surface 1a of the disc 1 at the midsection of the pole gap 9 and slot 10.

The head unit 11 has a stimulus drive coil 11b energized at 10.7 megacycles which generates an AC field parallel to the immersion field generated by the electromagnet. This stimulus field may be of the order of 0.1 Oersted. The high-frequency signal in the stimulus drive coil 11b causes minor loop variations to occur on the hysteresis loop, as, for example, at Q of FIG. 6A. These minor loop variations are detected by the sense coil 11a and represent incremental permeability, that is the $dB/dH$ which is displayed as the Y-axis of the display of FIG. 6B.

The sensor for the immersion field which constitutes the field along the X-axis is a Hall-effect probe 13. The Hall-effect probe works in conjunction with the Gaussmeter 24 to provide the means for calibration for the immersion field (x-axis). A current control potentiometer is provided to permit adjustment of the electromagnet for the desired peak flux field. The X-axis of the display is a representation of the linear sweep of the slowly varying immersion field provided by the electromagnet.

The signal for the stimulus drive coil 11b is provided from the 10.7 MHz generator 20. Signal level is a constant magnitude which provides a field considerably smaller than the magnitude of the immersion field from the electromagnet. The high-frequency perturbations to the hysteresis loop caused by the signal from signal generator 20 are detected by the sense coil 11a and fed through balance network 21 to detector-amplifier 23 where the signals are rectified and amplified to provide a Y-axis signal for the display unit 25.

A "function switch" (whose operating effects are shown in FIG. 7) is provided in Program Control 22a for the various actions required in the testing sequence shown in FIG. 7.

The actions occurring during the test sequence are shown initially in FIG. 7 when the function switch is "OFF," during which time the current through the magnet assembly 14 is zero, the display unit is blanked out, and of course, there is no immersion field $H_i$. Continuing with FIG. 7, when the function switch is set to BALANCE, the electromagnet current increases in the "negative" direction to point $A_t$ and generates an immersion field $H_i$ which saturates the disc film surface under test. At point $A_t$ the current through the electromagnet remains constant while the "nulling" operation is effected. During nulling a set of ferrite slugs 31 and 35 are adjusted to cancel the "unwanted" components of the sense signal. This is done after the disc 1 has been inserted into the slot 10 so that any unwanted coupling is canceled and a "zero" level setting can be made.

The function is then set to RESET, which reduces the electromagnet current to zero, and which sets the system just preliminary to point $B_t$ on the timing diagram of FIG. 7, and also places all circuits in readiness for the "CYCLE" mode.

The function switch is then set to CYCLE, where upon the electromagnet current drives the system through points B, C, D, and E of the hysteresis curve FIG. 6A, and $B_t$, $C_t$, $E_t$ of the timing diagram of FIG. 7. The display unit 25 is automatically unblanked during this time and traces out the display, B', C', D', E', of FIG. 6B.

Thus the horizontal X-axis (FIG. 6B of the display unit 25 is proportional to the immersion field of the electromagnet, and the vertical Y-axis of the display unit 25 is proportional to the slope of the hysteresis B-H curve.

At point B' of FIG. 6B, the trace is somewhat higher than that at D', since the slope at the corresponding point B of FIG. 6A is not zero. The display trace of FIG. 6B rises to a maximum at point C', corresponding to the point C of FIG. 6A where the hysteresis curve crosses the X-axis (maximum slope). Point C established the value of Hc, the coercivity of the magnetic film (C' to D' of FIG. 6B) then drops, finally reaching the level D' comparable to the level obtained during nulling, because the slope at D of FIG. 6A is equal to that at point A, at which the system was originally nulled. It will be noted that after this level point is reached at D', the display further to the right is a horizontal line, because further increases in immersion field intensity $H_i$ do not modify the magnetic characteristics. The start of the reverse trace from point D' to E' is substantially along the same horizontal line. The value then increases as the slope of the hysteresis curve FIG. 6A increases. Points E' and B' on the display curve of FIG. 6B are only nominally coincident, because the slopes at the corresponding points of the hysteresis curve are not equal. However, the hysteresis of the electromagnet core causes a slight distortion of the display so that points B' and E', which are zero current points, are not on the Y-axis of the hysteresis curve FIG. 6A, but are displaced by the residual magnetism, $B_r$, of the electromagnetic core.

In the display curve of FIG. 6B, points B' and E' are displaced laterally from the Y-axis but Hc is indicated exactly. Referring to FIG. 6B, it will be seen that line K—K' which represents the maximum distance between the forward and reverse traces, can be extended downward to cross at point Hc the X-axis of the immersion field abscissa, $H_i$, and that this intersection represents a value of field which is equal to the coercivity or Hc of the magnetic film.

The hysteresis of the electromagnet core causes a slight distortion of the display. It will be noted that points B and E of FIG. 6A, which are zero magnet current points, are not located on the Y-axis (or X-axis of magnetic induction) of the hysteresis curve, but are displaced by the residual magnetism $B_r$ of the core. In FIG. 6B, the points D' and E' are displaced laterally from the D and E points on the Y-axis of FIG. 6A. In FIG. 6A the intersection point of the hysteresis curve with the X-axis at point C indicated the value of coercivity of the magnetic film while in the drawing of FIG. 6B the coercivity is that indicated at point Hc due to displacement caused by the residual magnetism of the electromagnet core, $B_r$.

To determine the residual magnetic induction of the electromagnet core $B_r$ by measuring the area of the display trace, the line D', E' of the display curve must be extended to intercept the line B' C' as shown by the dash line, to point M.

Note that it is essential that the electromagnet current be sufficient to saturate the magnetic surface. If this is not the case then considerable error will ensue. Without saturation, the line to point D' would never assume its horizontal position and there would be variations in the area of the B', C', D', E', M tracing.

What is claimed is:

1. In a testing apparatus for determining the magnetic characteristics of a magnetic thin film, in combination: magnetic field provision means for developing a DC immersion field; program control means for said magnetic field provision means for controlling the timing, magnitude, and direction of said DC immersion field; means for placing a magnetic thin film into and parallel to said DC immersion field; a head unit juxtaposed along said magnetic thin film for generating an AC magnetic field through said thin film in a direction parallel to said immersion field, and to pick up a portion of said generated AC field which has been coupled through said thin film; AC energization means to energize said head unit; detector-amplifier means for the signal sensed by said head unit; nulling means between said AC energization means and said head unit for nulling unwanted signals derived from said head unit; means for measuring the magnitude of said DC immersion field; and display means for obtaining a displayed trace of sensed signals from said head unit as a function of said immersion field.

2. The apparatus as in claim 1 wherein said head unit comprises a stimulus coil and a sense coil having alternately juxtaposed windings in a plane parallel to said thin film.

3. The apparatus as in claim 1 wherein said program control means provides for a negative saturation magnitude of immersion field for nulling unwanted output signals from said head unit, and provides for a positively increasing immersion field at least to the point of saturating said magnetic thin film and a linearly decreasing magnitude of DC immersion field to the point of zero immersion field.

4. The apparatus as in claim 1 wherein the magnetic field provision means is provided with an airgap between poles and a longitudinally slotted gap area in a plane parallel to said DC immersion field permitting insertion of a magnetic thin film therein.

5. An apparatus as in claim 2 wherein said stimulus coil and sense coil comprising the head unit may be moved into and out of juxtaposition with said magnetic thin film.

6. The apparatus as in claim 1 wherein said nulling means comprises a network of at least two adjustable transformers for nulling in the output line of said head unit, the in-phase and out-of-phase components of the signal fed into said head unit.

7. The apparatus as in claim 2 wherein said means for measuring the magnitude of said DC immersion field is comprised of a HALL probe unit placed in said DC immersion field adjacent to said magnetic thin film.

8. The apparatus as in claim 1 wherein said displayed trace comprises a forward trace and a reverse trace enclosing an area which is representative of the residual magnetism of the core of the immersion field magnet.

9. The apparatus as in claim 8 wherein the line of maximum vertical distance between the forward trace and reverse trace, when extended to intersect the abscissa, intersects a point representative of the coercive force of said magnet thin film.

10. The apparatus as in claim 2 wherein the DC immersion field is controllably variable from the point of zero field to the point of magnetic saturation of said thin film, and said AC magnetic field developed by said stimulus coil is a constant amplitude sinewave whose magnitude is smaller that the magnitude of the DC immersion field at saturation of the magnetic thin film.

11. A method of testing the magnetic characteristics of a magnetic thin film comprising the steps of:
   a. immersing a magnetic thin film in a DC immersion magnetic field;
   b. juxtaposing parallel to said magnetic thin film an interwound planar pair of coils coupled by said magnetic thin film;
   c. saturating said magnetic thin film by increasing the magnitude of said DC immersion field;
   d. energizing a first one of said planar pair of coils with an AC stimulus signal for coupling through said magnetic thin film an induced sense signal in the second one of said planar pair of coils;
   e. nulling out the induced sense signals derived from said second planar coil;
   f. returning said DC immersion field to substantially zero;
   g. reversing said DC immersion field and linearly increasing its magnitude;
   h. decreasing linearly the magnitude of said DC immersion field to substantially zero; and
   i. displaying a signal derived from the output sense signal of the second planar coil as a function of the magnitude of said DC immersion field.

12. The method as in claim 11 including the step of making a display trace in recorded form showing the variation of output sense signal as a function of said DC immersion field, said trace having a forward trace and a reverse trace corresponding to the increasing and decreasing phases of the immersion magnetic field.

13. The method as in claim 12 including the step of measuring the area enclosed by the display trace for determining the residual magnetism of a magnetic immersion field provision means.

14. The method as in claim 12 including the step of drawing a line of maximum vertical distance between the upper and lower sections of said display trace and extending said line vertically to intersect the abscissa line of zero magnetic susceptibility for determining the coercive force of said magnetic thin film.